(12) United States Patent
Fleischmann (10) Patent No.: US 9,542,161 B2
(45) Date of Patent: Jan. 10, 2017

(54) METHOD AND SYSTEM FOR GENERATING A SOURCE CODE FOR A COMPUTER PROGRAM FOR EXECUTION AND SIMULATION OF A PROCESS

(71) Applicant: Metasonic AG, Pfaffenhofen (DE)

(72) Inventor: Albert Fleischmann, Pfaffenhofen (DE)

(73) Assignee: METASONIC GMBH, Pfaffenhofen (DE)

( * ) Notice: Subject to any disclaimer, the term of this patent is extended or adjusted under 35 U.S.C. 154(b) by 0 days.

(21) Appl. No.: 13/855,776

(22) Filed: Apr. 3, 2013

(65) Prior Publication Data

US 2014/0082587 A1    Mar. 20, 2014

(30) Foreign Application Priority Data

Apr. 3, 2012    (DE) .......................... 10 2012 102 883

(51) Int. Cl.
*G06F 9/44*    (2006.01)
*G06F 9/45*    (2006.01)

(52) U.S. Cl.
CPC . *G06F 8/30* (2013.01); *G06F 8/35* (2013.01); *G06F 8/443* (2013.01)

(58) Field of Classification Search
CPC ....................................................... G06F 8/30
See application file for complete search history.

(56) References Cited

U.S. PATENT DOCUMENTS

| 7,861,221 B2* | 12/2010 | Fleischmann et al. ....... 717/109 |
| 2003/0083910 A1* | 5/2003 | Sayal ..................... G06Q 10/10 |
| | | 717/102 |
| 2007/0100673 A1* | 5/2007 | Konakalla ........................ 705/7 |

* cited by examiner

*Primary Examiner* — Li B Zhen
*Assistant Examiner* — Amir Soltanzadeh
(74) *Attorney, Agent, or Firm* — Rankin, Hill & Clark LLP (57) ABSTRACT

The invention relates to a method and a system for the generation of a source code for a computer program for the execution and simulation of a process, comprising the following steps:
  analysis of a process description in which a process is presented in the form of at least one matrix (S-PM) wherein, in the matrix, subjects and process phases are linked to actions in such a way that it is determined by the matrix which actions are executed by which subject in the respective process phases, wherein with the aid of predetermined rules during analysis, messages are generated which are exchanged between the subjects, and
  automatic generation of a source code with the aid of the information contained in the matrix on the subjects and actions and with the aid of the messages determined by the analysis.

10 Claims, 8 Drawing Sheets

METHOD AND SYSTEM FOR GENERATING A SOURCE CODE FOR A COMPUTER PROGRAM FOR EXECUTION AND SIMULATION OF A PROCESS

The present invention relates to a method and a system for the generation of a source code for a computer program for the execution and simulation of a process.

Known from EP 1 589 416 A2 is a method and a system for the generation of a source code for a computer program for the execution and simulation of a complex process. In this method, a source code for a computer program is generated automatically from a process file in which processes are described. The process file is created by a user, preferably by means of a graphical user interface (GUI), wherein aids are provided for representing individual subjects in the graphical presentation, while messages are exchanged between the individual subjects. This results in a presentation which is similar to a flow chart.

In generating the source code, a separate source code file is produced for each subject, with a distinction being made in principle only between the commands "do", "send" and "receive". Through the provision of separate source code files for the individual subjects, an executable source code may be generated automatically even for very complex processes, since the individual source code files are very simply formed. The complexity is overcome by means of a multiplicity of source code files, which communicate with one another by means of messages. It has been found that, even in a very complex process, the individual subjects communicate only with a few other subjects, so that despite a multiplicity of subjects, the individual subject is simple and compact in form.

Described in the as yet unpublished European patent application with application number EP 12151052.3 is a further system and method for the generation of a source code for a computer program for the execution and simulation of a process from a graphical process description independent of the source code. The system comprises a process generator and a source code generator. The process generator is designed so that clusters with several subjects are generated automatically, while all possible exchanges of messages between the subjects are generated at the same time as the generation of the subjects. The process generator provides functions for the deletion of individual automatically generated messages, and a function for the generation of individual messages between one of the subjects of the cluster and a subject which is part of the cluster. The process generator thus supports the generation of the cluster and permits the linking of different clusters, by which means complex processes may be modulated very easily, quickly and reliably. These processes are converted into an immediately executable source code.

The two methods described above are very successful in practice, since the graphical description of the processes may be easily created by the user, and a source code for a computer program is then generated automatically. In the case of both methods, a complex process is split into several source code files, wherein one source code file may in each case comprise a single subject or a group of subjects (=cluster).

With these methods it is difficult, since the description of the processes is provided in presentations similar to flow charts, to obtain an overview of the parties involved and their contribution to the process.

Other methods and systems for the presentation of processes often use hierarchies. Known for example is the show three to five levels in such hierarchies (e.g. P. McDermott A. Sharp: *Workflow Modeling*: Artech House 2009, page 53; Horvath and Partner, editors. *Prozessmanagement umsetzen [Implementing Process Management]*: Schäfer Pöschl, 2005, page 52; R. Nelius, D. Slama: *Enterprise BPM*: dpunkt Verlag 2011, page 92). These levels are generally described as process ranges, business processes, processes, sub-processes or activities. At the same time, business processes are also defined as core processes and main processes.

In the ARIS system (A. W. Scheer: ARIS—from business process to application system, Springer Verlag, $4^{th}$ edition, 2001), process chains are used to give an overview of a process. A process chain shows the process of a process system and defines the sequence in which these processes may be executed in the process system. Here there are several levels of process chain. This means that an element which represents a process in a process chain may itself contain a process chain. At the lowest level, each element of a process chain contains a so-called event process chain (EPC). The EPC contains the activities to be executed in a process. At this lowest level, the EPCs are linked to the acting persons or objects carrying out the activity. Only on this lowest level can one tell who is involved in a process.

BPMN has pools and swimming lanes to describe process structures (see OMG: Business Process Model and Notation (bpmn): Technical Report, Access: December 2011). Each pool may have one or more swimming lanes. It is not permitted for a pool to be provided in another pool or a swimming lane in another swimming lane. Activities are assigned to swimming lanes. Here there are three abstraction levels: pools, swimming lanes and activities. The activities are each linked to the executing parties. In this presentation of processes too, the persons or objects involved are visible only on the lowest level.

ARIS and BPMN are widely used. With these methods it is however not possible to generate executable source codes automatically from the descriptions of the processes. It is also difficult here to obtain an overview of the parties and objects involved and their contribution to the processes concerned.

The use of a matrix for the simulation of processes is known (e.g. US 2006/206 366 A1, US 2007/0100673 A1, US 2010/0082498 A1).

The present invention is based on the problem of creating a method and a system for the generation of a source code for a computer program for the execution and simulation of a process, by which an executable source code is generated and which also gives the user, in a simple manner, an overview of the persons and objects involved and their contribution to the process concerned.

The problem is solved by a method according to claim 1 and a system according to claim 10. Advantageous developments are set out in the respective dependent claims.

The method according to the invention for the generation of a source code for the execution and simulation of a process comprises the following steps:

analysis of a process description in which a process is presented in the form of at least one matrix (S-PM) wherein, in the matrix, subjects and process phases are linked to actions in such a way that it is determined by the matrix which actions are executed by which subject in the respective process phases, wherein with the aid of predetermined rules during analysis, messages are generated which are exchanged between the subjects, and automatic generation of a source code with the aid of the information contained in the matrix on the subjects and actions and with the aid of the messages determined by the analysis.

According to the invention, the matrix is therefore analysed, in which subjects and phases of a process are linked by means of actions to be executed, wherein during this analysis of the matrix messages which are exchanged between the subjects are generated, and a source code is generated with the aid of the description of the process by means of the subjects and the messages to be exchanged between the subjects.

As soon as the messages are available, an executable source code may be generated by the method known from EP 1 589 416 A2, or by a method corresponding roughly to the method described in European patent application EP 12151052.3. Reference is therefore made to the full content of both these documents.

With the method according to the invention, messages are automatically generated from the matrix, in which the subjects are linked with phases of the process with the aid of actions. By this means it is possible to present a process by a matrix in which the subjects, i.e. the persons or objects involved, are listed and linked by actions to the process phases concerned. This description of the process gives the user a direct overview of the persons or objects involved and their activity in the process concerned. It is not therefore necessary to describe the process with a diagram similar to a flow chart, from which a source code may be generated. Instead it is sufficient to produce very compact diagrams in the form of matrices, allowing an overview, and from which a source code may then be generated automatically.

A user simulating a process must therefore only create a matrix (S-PM) and may convert this automatically into an executable source code and, by executing the source code, quickly determine whether his description of the process is correct.

The use of a matrix for the simulation of processes is certainly known ((e.g. US 2006/206 366 A1, US 2007/0100673 A1, US 2010/0082498 A1), but the automatic generation from a matrix of messages between the parties involved was not known. In the invention these messages are an integral part of the process description which is automatically converted into a source code.

Preferably the matrix includes at least three types of action, with a first type of action executing a non-communicative act, a second type of action supplying an action of the first type with information, and a third type of action containing information of an action of the first type. From these types of action, the relationship of the individual actions, Preferably the matrix includes at least three types of action, the E-action (Execute), in which a subject performs an act, an S-action (Support) in which a subject provides information to another subject executing an E-action, and an I-action (Information) in which a subject receives information from another subject executing an E-action. Defined below are pairs of subjects between which messages, all automatically generated, are exchanged:

E-message between a subject executing an E-action in a predetermined process phase and a subject executing an E-action in a subsequent phase;

S-message between a subject executing an S-action and a subject executing an E-action in the same process phase;

I-message between a subject executing an E-action and a subject executing an I-action in the same process phase.

This definition of the messages represents a set of rules for the generation of messages. For all pairs of subjects which fall under these rules, the relevant messages are generated.

In addition it is possible to generate SR-messages which are sent from the subjects executing E-actions and are supported by other subjects with information, to these other subjects in order to request the supporting information.

Within each process phase the messages are sorted in the order S-messages, E-messages and I-messages and, if SR-messages are present, they are inserted into the sequence at least before the relevant S-messages. This means that, within a process phase, firstly all supporting information is collected, then the action is executed, after which the information changed by the action is passed on.

Preferably each process phase has only a single E-action. Here it is not necessary for each process phase to have an I-action or an S-action. It is however expedient for a process phase to have at least either an S-action or an I-action. From the viewpoint of the execution or simulation of a process, an E-action may also be defined to the effect that it represents or depicts an action in the process through the changing of information. The changing of information may also comprise only the movement of information from one memory location to another memory location.

In the automatic generation of the source code, preferably functions are generated, each of which is assigned to a subject, wherein there at least three different functions, namely SEND, RECEIVE and DO. The functions SEND and RECEIVE are used to exchange the messages found between the subjects. The function DO represents the E-actions in the source code.

The RECEIVE functions for RECEIVING one or more S-messages are located in the source code before the DO function, and the SEND functions for SENDING one or more I-messages are located after the DO function.

Preferably several source code files are created, wherein a source code file may include in each case a process section defined by a matrix or solely the functions of one of the subjects. The several source code files are linked together by means of messages. Here it is also possible for a subject to be linked to several subjects, in particular so that an E-action may send different messages to different subjects. In this connection, during the execution or simulation of the process only one of these messages is sent since, by the transmission of a message from an E-action to another E-action, the process sequence is passed on to the other E-action and thereby to another process phase. This means that is linked by several messages to several other E-actions, such branching assumes a decision which is typically executed on the basis of a parameter supplied for example by means of an S-action of the E-action, i.e. depending on this parameter, a decision is made as to which of the different messages is to be sent.

If a separate source code file is generated for each subject, then the individual source code files are very simple in form and have a similar structure. The source code files of the individual subjects communicate with one another by means of messages. It has been found that, even for complex processes, each individual subject is linked to a relatively small number of other subjects, so that the complexity of the individual source code files is minimal. If a separate source code file is generated for each subject, then the step for automatic generation of a source code corresponds to the known method of EP 1 589 416 A2.

If a separate source code file is generated for the process section of a matrix, then the method corresponds roughly to that described in European patent application EP 12 151

052.3. The method according to the invention differs from this method in that only the messages which may be derived from the matrix are generated in source code, and not all possible messages between the subjects present in the process.

It is also possible, in a process, for one or more source code files to be generated which represent only a single subject, and for one or more source code files to be generated which represent in each case the entire process section of a matrix. This is especially useful when the process description has one or more matrices and subjects represented independently of the matrices.

Different predetermined program sections may be executed using the DO function. For this purpose the system may have a library of program sections, wherein the individual DO functions in the source code then contain only a reference to these program sections, by which these are then called up in the execution of the process or the simulation. It is also possible that external, in particular already compiled, computer programs are also called up and integrated in the process.

The E-action, S-action and I-action may also have different designations. What is important is that in each process phase an action is provided which executes a specific act, and further actions may be provided which supply the action executing the act with information, or obtain information from the action executing the act. The term "act" covers any activity of a subject, excluding sending and receiving. The term "act" therefore refers especially to non-communicative activities.

The invention is explained in detail and by way of example below with the aid of the drawings, which show.

Figure 8:
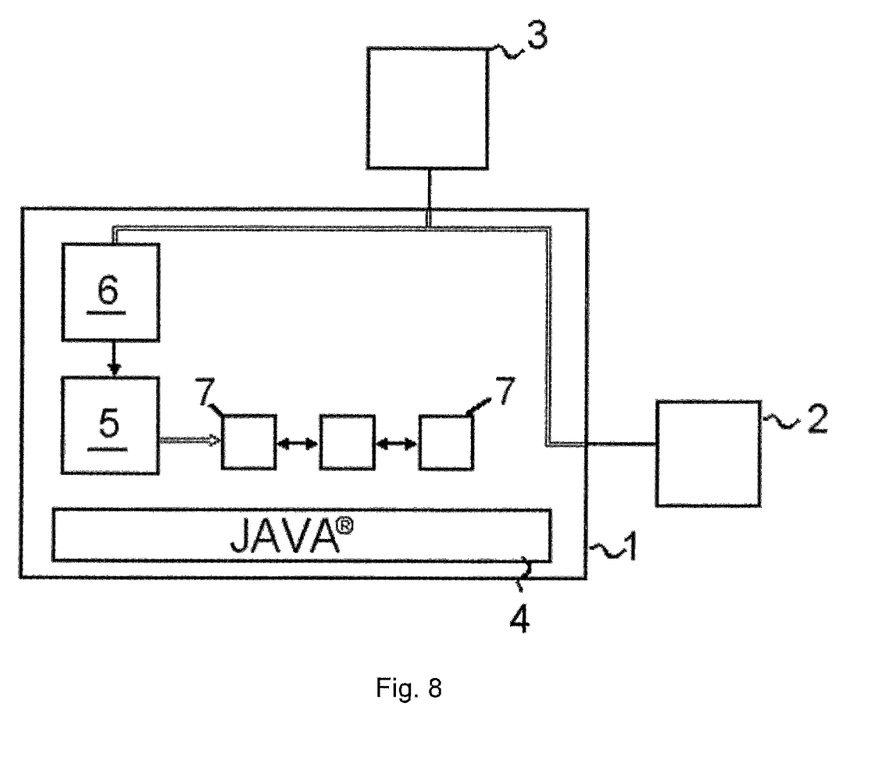

FIG. 8 shows in schematic form a block diagram of a system for the generation of a source code for a computer program for the execution or simulation of a process. The system comprises a computer system 1 which, for the purposes of the present invention comprises a single computer plus a network and may be a multiplicity of computers. The computer system 1 has at least one input device 2, comprising a keyboard and a computer mouse, together with an output device 3. The output device is typically a monitor or a beamer. The computer system 1 is provided with a Java®-platform 4. The system has a source code generator 4 and a matrix generator 6. The matrix generator 6 is a computer program used to generate a subject-process phases-matrix (S-PM) which is stored in a process file. The source code generator is another program, designed for the automatic generation of a source code 7 from the process file or from several process files.

The matrix generator 6 has a graphical user interface which may be used to generate an S-PM. Each S-P matrix is stored in a separate process file. The process files are read by the source code generator 5 and automatically converted into source code. This is explained in detail below with the aid of FIG. 1.

Figure 1:
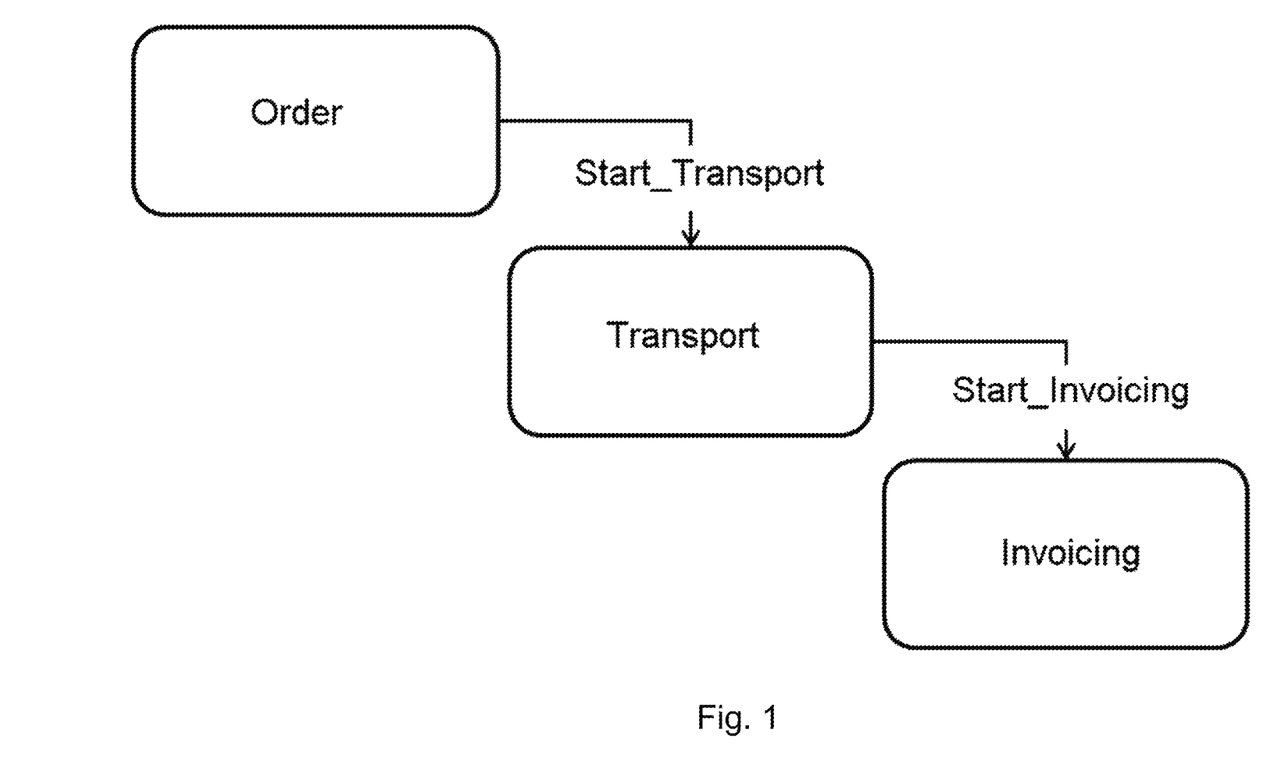
FIG. 1 a process in a block diagram with three sub-processes

The invention is explained below with the aid of a process management project of a small transport firm (FIG. 1). This process comprises three sub-processes: handle order, transport and invoicing. These three sub-processes are executed consecutively.

Figure 2:
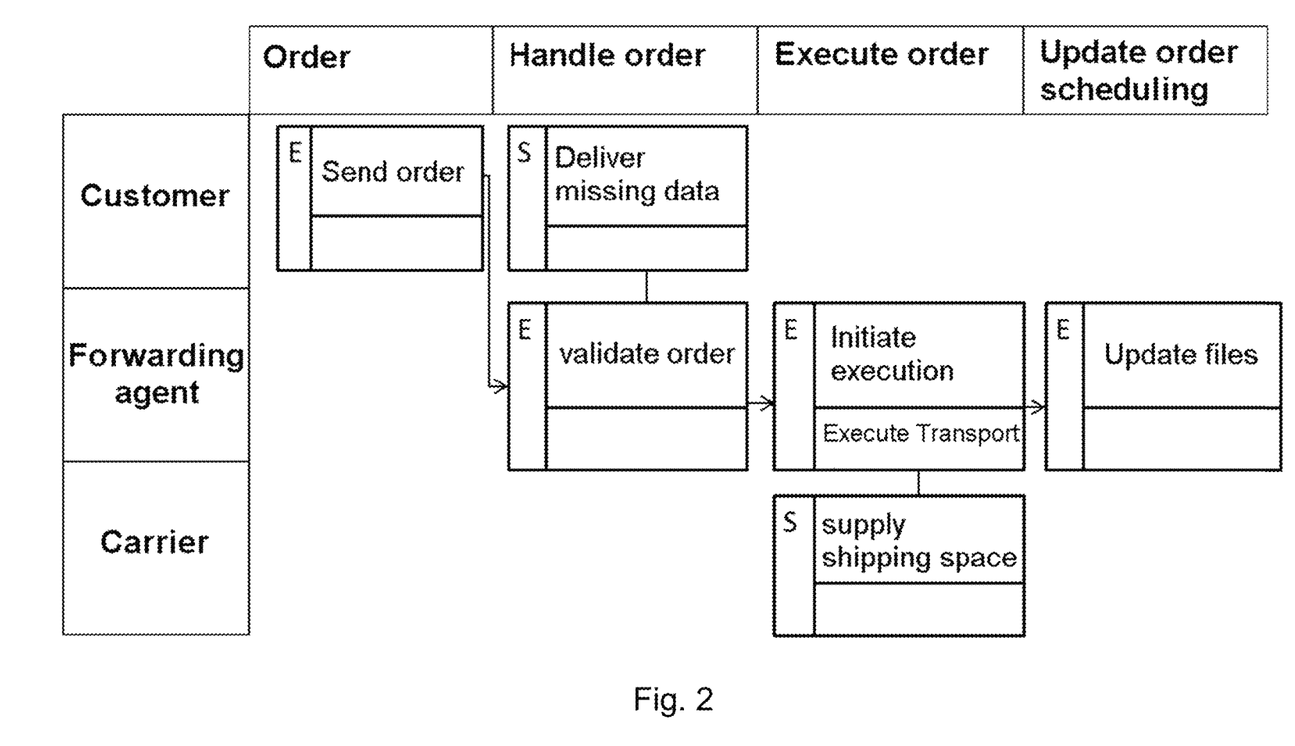
FIG. 2 a first sub-process from FIG. 1 subject-process phases-matrix (S-PM)

The execution logic of each of these sub-processes may be represented by a subject-process phases-matrix (S-PM). FIG. 2 shows the S-PM of the first sub-process of FIG. 1. Subjects which participate in the sub-process are listed in the S-PM in the column at the left-hand edge. The subjects are customer, forwarding agent and carrier. Listed in the first line are the individual process phases order, handle order, execute order and update order scheduling.

In the S-PM, the individual subjects are linked to one or more process phases by means of actions, i.e. in the matrix, in the line of the respective subject an action is entered in the column of the process phase in which this action is executed. The present embodiment comprises three types of action, the E-action (Execute), in which the relevant subject executes an act, an S-action (Support) in which the relevant subject assists an E-action in this process phase by providing the executing subject with information, and an I-action (Information) in which a subject obtains information from another subject executing an E-action.

The process sequence passes in principle from an E-action of one process phase to an E-action of the subsequent process phase. This is represented in the S-PM by a corresponding arrow between the respective E-actions. It is also possible for a process sequence to branch after the execution of an E-action. In this case there is at least one second arrow at the exit from an E-action (in the S-PM, on the right-hand side of the box representing the E-action), an additional arrow leading to the entrance (left-hand side of the box representing the E-action) of a further E-action which is not located in the subsequent process phase. Such branching may lead to a preceding E-action, or to an E-action located in the next but one or even a later process phase.

The individual actions are in each case entered in the S-PM in a small box, with each box divided into three sub-boxes. One of the sub-boxes is located at the left-hand edge, in which the letter "E" or "S" or "I" respectively denote the three types of action, namely the E-action, S-action and I-action. Provided to the right of this are an upper and a lower box, with the name of the relevant action entered in the upper box, while a link to another sub-process may be entered in the lower box. For this purpose the name of the other sub-process is entered in the lower box (e.g. "Execute Transport" in the E-action of the process phase "Execute order", after which the process sequence moves on to the second sub-process).

The S-actions of a process phase supply the subject executing the E-action with information. Consequently, these actions are linked by a dash in the S-PM. The I-actions of a specific subject signify that this subject is supplied with information by the E-action in the same process phase in which the I-action is located.

Consequently the I-actions are also linked by a dash to the E-action of the same process phase.

In the S-PM according to FIG. 2, only the customer executes an E-action during the first process phase "order", in which he sends an order to the forwarding agent. In the subsequent process phase "handle order", the forwarding agent handles the incoming order, requesting from the customer missing data, which is passed to him through a suitable S-action. In the subsequent process phase, the forwarding agent uses an E-action to instigate execution of the order, which involves asking the carrier for the available transport capacity. The carrier passes this information to the forwarding agent in an S-action. In the order completion process phase, the forwarding agent summarises all relevant order data for execution of the order.

This example of an S-PM of the sub-process according to FIG. 2 shows that the process sequence moves from the respective E-action to the E-action of the following process phase wherein, within the individual process phases the E-actions, each of which may be executed by a specific subject, may be assisted by information from other subjects (S-actions).

Figure 3:
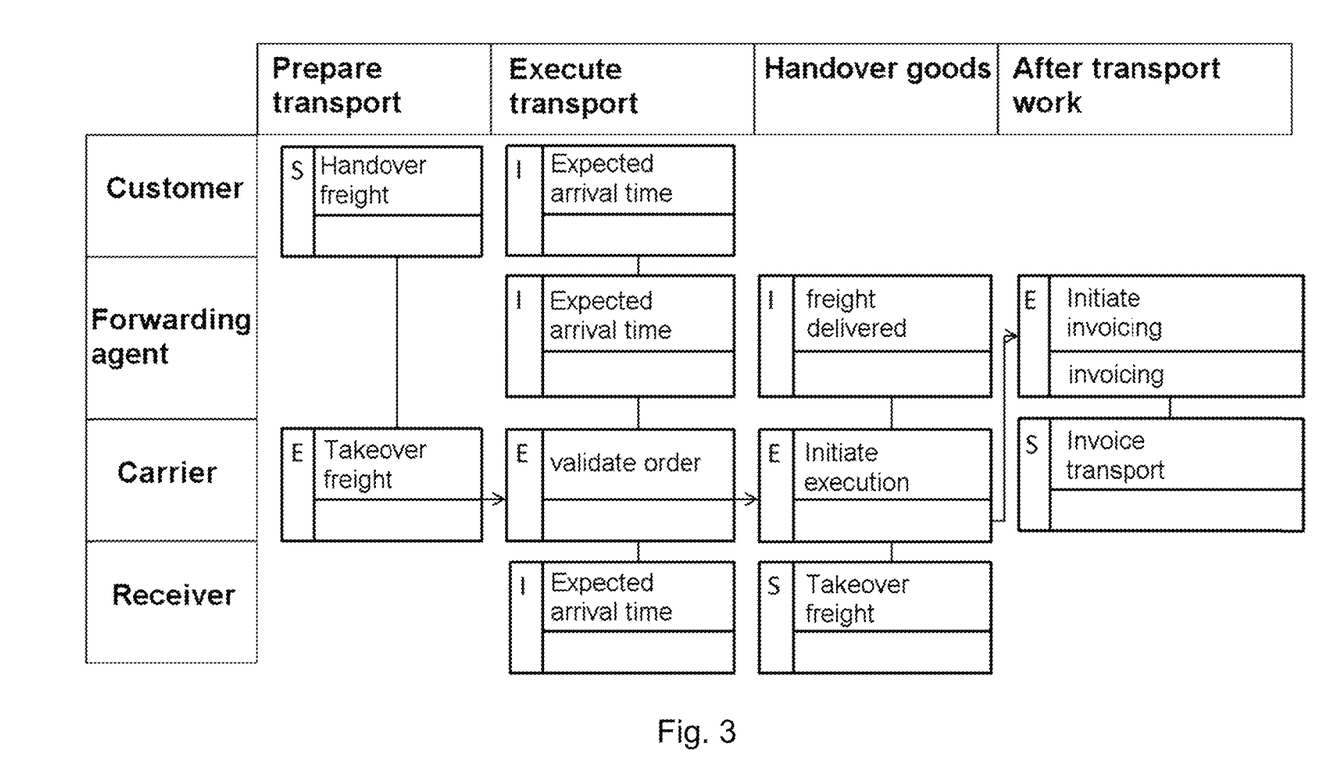
FIG. 3 a second sub-process in a subject-process phases-matrix (S-PM)

FIG. 3 shows the S-PM of the second sub-process of FIG. 1 (transport). In this S-PM, once again there is provision for one E-action in each process phase, while individual process phases also have S-actions and I-actions. Using I-actions, the respective subjects of the line of the S-PM in which the I-action is located are supplied with information by the E-action of the same process phase. The relevant I-actions are therefore connected by lines to the respective E-action.

In principle it is possible to present an entire process in a single S-PM. In practice, however, this is not sensible, since with a more extensive process the S-PM would become very unclear. It is therefore expedient to divide a process into several sub-processes, with each sub-process being shown in a separate S-PM. A source code is generated automatically from the S-PMs of the individual sub-processes. The process of generation of a source code commences with step S1 (FIG. 7), A first S-PM is input in step S2.

Figure 7:
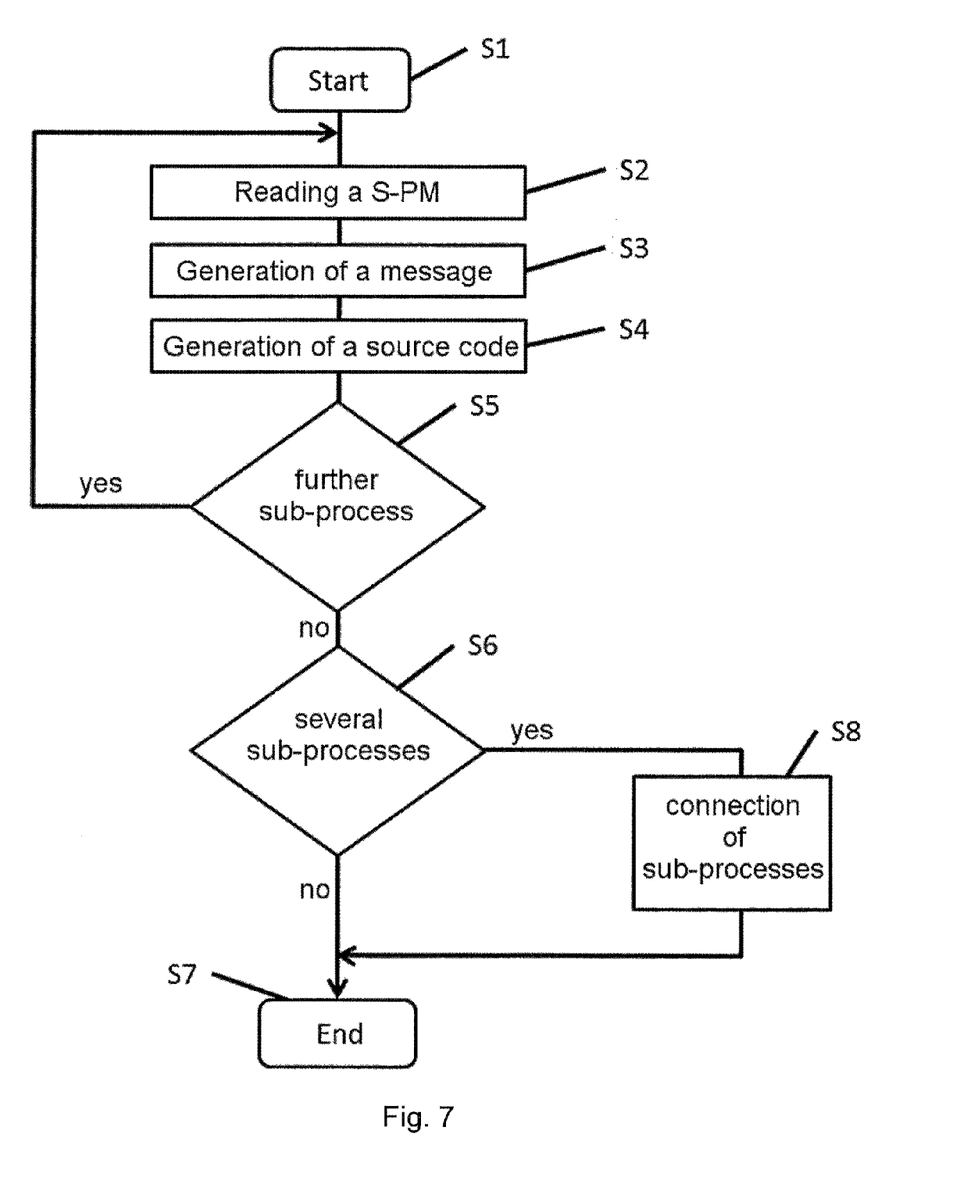
FIG. 7 a method for the automatic generation of a source code from at least one S-PM, and FIG. 8 a schematic block diagram of a system for the generation of a source code for a computer program.

Next, messages between individual subjects of the S-PM are generated automatically (step S3). The messages are generated according to predetermined rules. In the present embodiment, messages are generated in accordance with the following definitions:

E-message between a subject executing an E-action of a predetermined process phase, and a subject executing an E-action in a subsequent process phase SR-message between a subject executing an E-action and supported by another subject with information, which is sent to this other subject in order to request the supporting information S-message between a subject executing an S-action and a subject executing the E-action in the same process phase, and I-action between a subject executing an E-action and a subject executing an I-action in the same process phase.

The messages between two subjects defined above are thus clearly defined by the respective action(s). In step S3, all of these messages are generated automatically.

The messages may be provided with a designation automatically. In the present embodiment, the individual messages are described by the following names:
E-message: "E-name of the subsequent phase"
SR-message: "S-name of the phase ?"
S-message: "Name of the phase S!"
I-message: "I-name of the phase".

In addition, messages for the linking of sub-processes are automatically generated when such linking is defined in the matrix. The subject executing such a linked action (e.g. the forwarding agent in FIG. 2), sends a message to the E-action in the first process phase of the linked sub-process or the linked S-PM.

Figure 4:
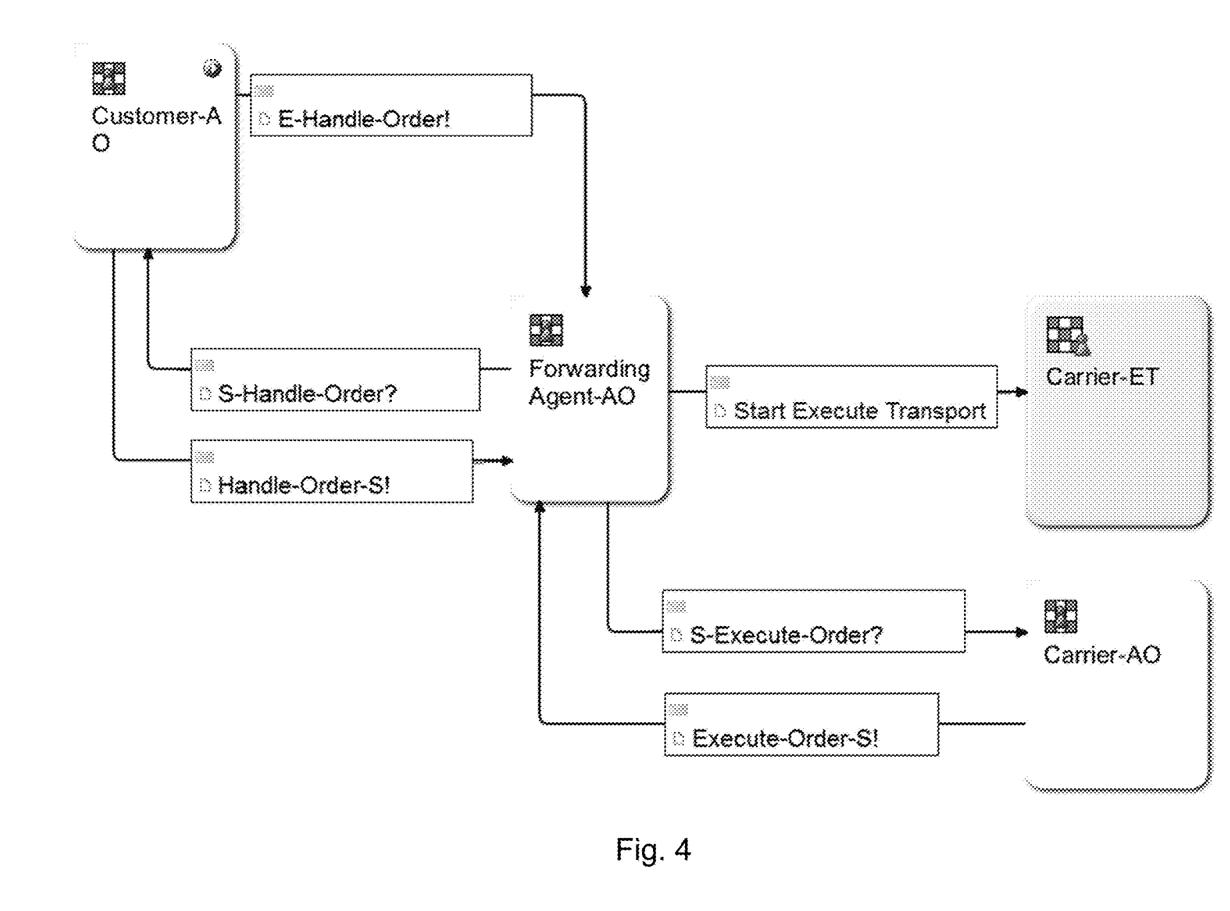
FIG. 4 a communication diagram of the first sub-process of FIG. 1

FIG. 4 shows a subject communication diagram of the first sub-process of FIG. 1, in which the subjects of this sub-process and the messages exchanged between the subjects are shown.

The messages of a sub-process are arranged in a specific order. Located within a process phase are firstly the SR-messages and then the corresponding S-messages, then the I-messages followed by the E-messages. The groups of messages of the respective process phases are sorted consecutively in the S-PM corresponding to the process phase. The S-messages may follow directly the corresponding SR-messages. It is however also possible for several SR-messages to be executed first, and only then for the corresponding S-messages to be executed.

The message "START EXECUTE TRANSPORT" in FIG. 4 is sent by the forwarding agent of the first sub-process to the carrier of the second sub-process. This "linking message" is generated, on the basis of the linking entered in the S-PM in FIG. 2, in the E-action of the process phase "execute order". By sending this message, the process sequence is carried forward from the first sub-process to the second sub-process.

In step S4 the source code is generated with the aid of the messages and the subjects between which the messages are exchanged.

In the course of the automatic generation of the source codes, functions are generated which are each assigned to a subject and comprise three different functions, namely SEND, RECEIVE and DO. The functions SEND and RECEIVE are used to exchange the determined messages between subjects. With the function DO, the E-actions are represented in the source code.

Each message is therefore represented in the source code by two functions, with the one function SEND being executed by the subject sending the relevant message, and the function RECEIVE being executed by the subject receiving the relevant message. The order of the functions SEND and RECEIVE in the source code is of course such that firstly the function SEND and then the function RECEIVE is executed. The individual messages are converted by the functions SEND and RECEIVE into the source code in the pre-sorted order.

The function DO, by which the E-actions are represented in the source code, is arranged in the source code after the execution of the functions to represent the SR-messages and S-messages and before the execution of the I-messages, within the respective process phase. The functions for execution of the E-message of the respective process phase are arranged after the functions for execution of the I-messages.

The source code of a process phase therefore defines firstly the SR-messages and S-messages, then the DO function, then the I-messages and then the E-message(s).

This order repeats itself for the individual process phases in each sub-process.

After the generation of the source code for a sub-process, a check is made in step S5 as to whether further sub-processes exist. If this is the case, then the process sequence branches to step S2, and further source code for the additional sub-process is generated by steps S2, S3 and S4.

If it is found in step S5 that no further sub-processes are present, the process sequence moves on to step S6, in which a check is made as to whether source code of several sub-processes is present. If this is not the case, it means that source code has been generated only for one S-PM. The process sequence may then be terminated directly with step S7.

If however several sub-processes have been converted into source code, then the process sequence passes from step S6 to step S8, in which the source code of the individual sub-processes is linked together.

The linking of the source code of the individual sub-processes is effected by the linking messages described above, which are defined in an action, in particular an F-action, of a specific sub-process, and branch to another sub-process, with the linking message being sent to the E-action of the first process phase of the other sub-process. Typically the linking is effected by transmission of a message from the F-action and the last process phase of a sub-process to the E-action of the first process phase of the subsequent sub-process. In this way sub-processes may be linked to one another consecutively.

In principle, however, it is also possible to link E-actions of any desired process phase of a preceding sub-process with an E-action of any desired process phase of a subsequent sub-process. This occurs especially in cases where the process sequence is branched within a sub-process, so that from one E-action on the one hand the process sequence passes on to the E-action of the subsequent process phase, and on the other hand the process sequence is transferred to any desired F-action, which may also be an E-action of another sub-process. Such branching is to be identified in the S-PM. The messages for linking source code of different sub-processes may also be generated automatically from a higher-level process, as shown e.g. in FIG. 1. From this process diagram it is clear which sub-processes are linked to one another, so that a suitable message may be generated automatically between the E-action of the last process phase of the preceding sub-process and the E-action of the first process phase of the subsequent sub-process.

Figure 6:
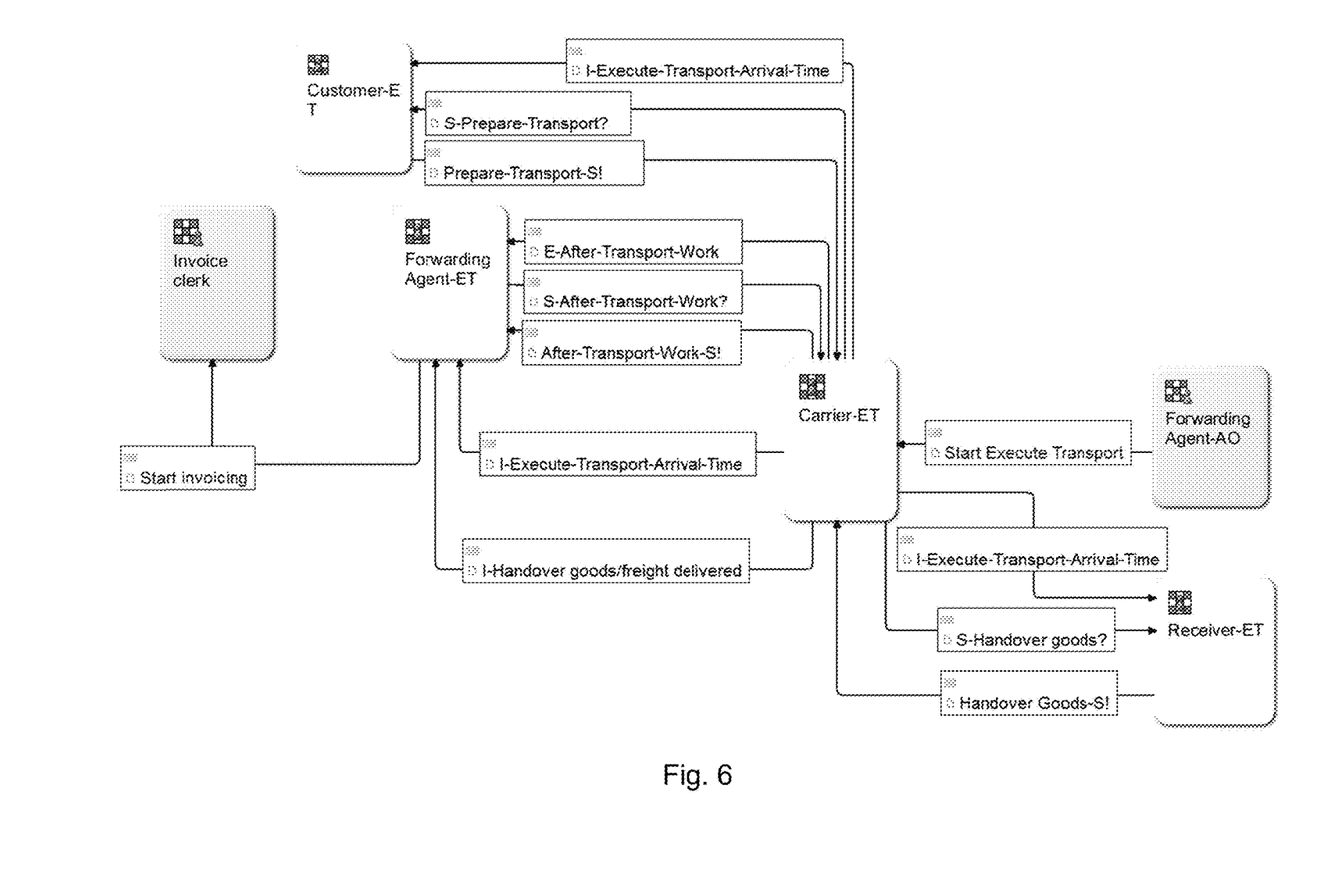
FIG. 6 a subject communication diagram of the second sub-process of FIG. 1

For linking the source codes of different sub-processes, the subjects of each sub-process are identified by a suffix as belonging to the respective sub-process. FIG. 4 shows the sub-process of order handling in a subject communication diagram, in which the subjects of the sub-process are identified by the suffix "AO". The subjects of the second sub-process of this example are identified by the suffix "ET" (FIG. 6). These suffixes ("AO" and "ET" respectively) describe the respective sub-processes ("order" or "transport"). Consequently a link between two sub-processes may be clearly defined, even when the sub-processes contain the same subjects.

The linking of the source code of the individual sub-processes may also be effected by mapping the same subjects of different sub-processes on top of one another.

In this connection, in the course of linking, no additional messages are generated, but instead existing messages are transmitted to the source code of a further sub-process, by interchanging essentially identical subjects of different sub-processes, or by mapping them on to one another.

Figure 5:
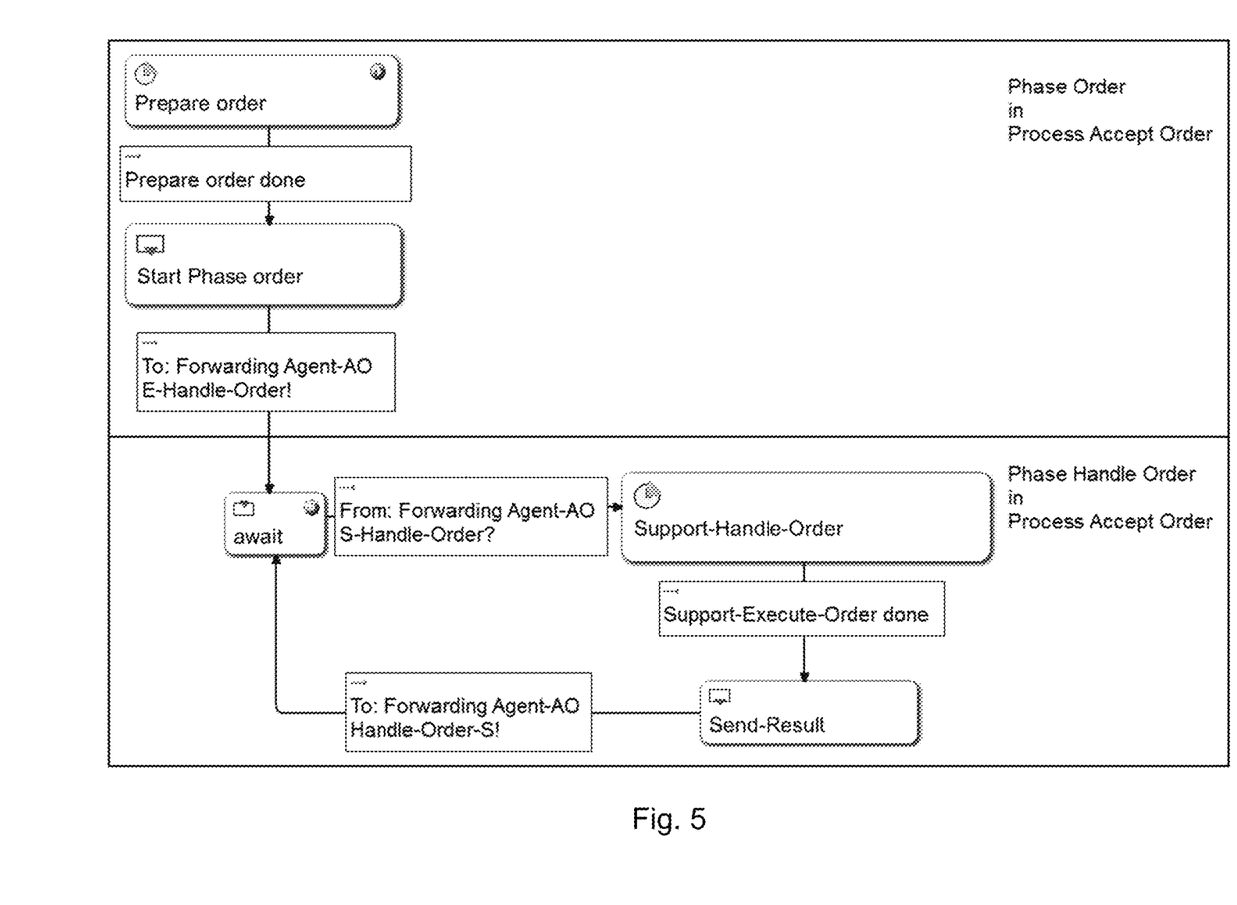
FIG. 5 a subject behaviour diagram of a subject during two process phases

FIG. 5 shows a subject behaviour diagram of the subject "customer" of the first sub-process according to FIG. 1 during the two process phases "order" and "handle order". The matrix generator 6 may be designed with an additional function, by which such subject behaviour diagrams may be generated automatically from the S-PM. From these subject behaviour diagrams the user is able to tell how individual subjects behave, i.e. what activities they carry out. It is also possible to provide for the user to make further additions to such a subject behaviour diagram, which are then stored in the process file and converted into source code by the source code generator. In the course of this, it is possible to add e.g. refinements. Refinements are predetermined program sections which are integrated in the process. Preferably they are linked to an E-action so that the refinements are executed in the source code within a DO function. The refinements may be source code sections. They may however also be program sections already compiled. Especially described as refinements are program sections originating from a source outside the system and integrated in the process. Preferably the system also has a library of separate program sections in the form of source code or compiled computer code which are integrated in the process. The integration of such program sections is in principle also possible within an S-PM.

The communication diagrams according to FIG. 4 and FIG. 6 may also be generated automatically by means of a supplementary function of the matrix manager. All automatically generated messages are shown in the communication diagrams. If the matrix manager is designed to generate the communication diagrams, then the process step of automatic generation of messages between the subjects is executed by the matrix manager. Otherwise there is also the option of allowing the messages to be generated by the process generator during generation of the source code. The user may also make changes in the presentation of the communication diagram, in particular correcting the exchange of messages or supplementing with additional messages.

With the present invention it is therefore possible to generate the source code automatically from an S-PM. Within the scope of the invention it is however also possible to generate automatically further special diagrams in which the user may refine the process. All this information is stored in the process file, so that it may then be converted automatically into source code.

The process generator is so designed that the user of the system is able to make changes and additions to the S-PM or to individual subjects only in the matrix manager. The user writes no computer code whatsoever. At the conclusion of modelling of the process with the aid of the S-PM, storage takes place, involving storage of a process description in a meta-language in one or more process files. This process description in the meta-language is converted into a source code automatically by the source code generator. This source code may be executed either directly by an interpreter or converted into an executable machine code by a compiler.

When an interpreter is used, the source code generator may also be integrated in the matrix generator, with the process description in the meta-language being made sufficiently precise for the interpreter that it may be executed directly by the interpreter. However, the embodiment with separate source code generator is preferred, with preferably a separate source code being generated for each S-PM. By this means, different process sections may be brought to execution on different computers, with the computers linked to one another through a data network, so that subjects of the different process sections may exchange messages with one another.

Preferably, a separate process file is also generated for each S-PM. The process file may also contain details on the computer to which the process section is to be brought for execution, with static or dynamic IP address, where applicable the IP address of a server, optional details such as the name of the developer and the version. It may also be expedient to provide internal and external subjects, wherein internal subjects may communicate only with other subjects within the process section, and external subjects may communicate with other external subjects of other process sections. The external subjects may therefore contain commands for the external exchange of messages, i.e. beyond the boundaries of the process sections. Of course the external subjects may also communicate with the internal subjects of their own process section.

A process may therefore be created in modular form from many process sections. Individual process sections may also be simply exchanged within a process. The exchange of messages between the subjects of different process sections may be determined by the matrix manager. By this means, different process sections are linked to one another. The individual process sections may be created very quickly, easily and reliably using the system and the method according to the invention. It is also possible to provide input buffers, also known as input pools, for the receiving of messages, as is already known from U.S. Pat. No. 7,861,221. The receiving capacity of these input pools or input buffers is adjustable, with the preset value being generally 1000 messages. Additional input pool restrictions may also be set, e.g. the reservation of predetermined receiving capacity for certain senders or certain types of message. By this means, a separate receiving capacity in the input pool is reserved for each sender or each message type. These receiving capacities thus form independent partitions of the input pool, ensuring that a particular sender alone cannot fill the input pool completely, but instead that a predetermined partition is available for specific senders or specific message types, independent of the message volume from other senders.

The receiving of messages is executed by means of non-active waiting for the message concerned. This non-active waiting is based on the so-called monitor concept, already described in October 1974 by Hoare C. A. R. in the article "Monitors: An operating system structuring concept" in Comun. ACM 17, 10. In simple terms this monitor concept may be described as a shifting of the waiting function from a program level into the operating system level or process level. The important fact is that this monitor concept prevents a multiplicity of tasks in a multitask system from being active simultaneously, and repeatedly demanding processor capacity for the execution of waiting. Through this monitor concept, the waiting of a multiplicity of tasks is monitored by just a single operating system task. In a simple manner, this monitor concept allows a multiplicity of programs and/or tasks to run in parallel, and to await data from another respective task or program, without appreciable impairment of processor capacity. In JAVA, the monitor concept is implemented through the methods "Notify", NotfiyAll" and "Wait".

In the present invention, as also in U.S. Pat. No. 7,861, 221, the source code may be generated from the process file. However, the present invention differs from the known method in that a separate source code is not generated for each subject, but only for each S-PM, comprising one or more subjects. Preferably a JAVA® class is compiled for each process section represented by an S-PM. This JAVA® class inherits methods from a pre-programmed standard class, which is supplemented by a number of methods. A corresponding source code file is initialised, i.e. a method is written for initialising the class in the source code. This method is described in JAVA® as the constructor. Entered in this constructor are the process file name and a cluster ID. The JAVA® method "Main" is entered in the source code. This Main method contains a run method call inherited from a pre-programmed standard class. Optionally, method calls for refinement functions may also be entered in the source code.

This source code may then be either interpreted by an interpreter or compiled by a compiler.

The invention claimed is:

1. A method for generating a source code for executing or simulating a process that involves subjects, process phases and actions, the method comprising the following steps:
   providing predetermined rules for automatically generating and exchanging messages between the subjects;
   analysing a process description in which the process is presented in a form of at least one matrix (S-PM), wherein, in the matrix, the subjects and the process phases are linked to the actions in such a way that it is determined by the matrix which actions are executed by which subjects in respective process phases;
   automatically generating messages using the predetermined rules based upon analysis of the at least one matrix (S-PM) during the analysing step;
   exchanging the automatically generated messages between the subjects; and
   generating the source code automatically using information contained in the matrix relating to the subjects and the actions, and using the automatically generated messages exchanged between the subjects;
   wherein in the automatic generation of the source code, functions are generated,
   wherein each of said functions is assigned to a subject,
   wherein there at least three different functions including SEND, RECEIVE and DO,
   wherein the SEND and RECEIVE functions are used to exchange the messages between the subjects,
   wherein the matrix includes at least three types of action, including:
      an E-action (Execute), in which a subject performs an act;
      an S-action (Support) in which a subject provides information to another subject executing an E-action; and
      an I-action (Information) in which a subject receives information from another subject executing an E-action;
   wherein all of the following messages are generated and exchanged:
      an E-message between a subject executing an E-action in a predetermined process phase and a subject executing an E-action in a subsequent phase;
      an S-message between a subject executing an S-action and a subject executing an E-action in the same process phase; and
      an I-message between a subject executing an E-action and a subject executing an I-action in the same process phase,
   wherein within each process phase the messages are sorted in order: S-messages; E-message; and I-message, and
   wherein in the automatic generation of the source code, E-actions are represented in the source code by the function DO, and within a process phase the RECEIVE functions for RECEIVING one or more S-messages are located in the source code before the DO function, and the SEND functions for SENDING one or more I-messages are located after the DO function.

2. The method according to claim 1, wherein the matrix further includes:
   a first type of action that executes a non-communicative act,
   a second type of action that supplies the first type of action with information, and
   a third type of action that contains information of the first type of action.

3. The method according to claim 2, further comprising generating SR-messages, which are sent from subjects executing non-communicative acts supported by information received from other subjects to said other subjects in order to request the supporting information.

4. The method according to claim 1, further comprising generating SR-messages, which are sent from subjects executing E-actions supported by information received from other subjects to said other subjects in order to request the supporting information.

5. The method according to claim 4, wherein SR-messages are inserted into sequence at least before relevant S-messages.

6. The method according to claim 1, wherein several source code files are created, wherein each of the several source code files includes a process presented in a form of at least one matrix or functions of one of the subjects, and wherein the several source code files are linked together by means of messages.

7. The method according to claim 1, wherein the DO function is used to execute different predetermined program sections which are determined by a suitable description in the matrix, and wherein one of said different predetermined program sections is also used to call up predetermined external computer programs and to integrate said predetermined external computer programs in the process.

8. A system for generating a source code for a computer program for executing or simulating a process that involves subjects, process phases and actions, said system comprising a computer system with at least one input device and one output device on which software for execution of a method is stored and with which the following steps are executed:
providing predetermined rules for automatically generating and exchanging messages between the subjects;
analysing a process description in which the process is presented in a form of at least one matrix (S-PM), wherein, in the matrix, the subjects and the process phases are linked to the actions in such a way that it is determined by the matrix which actions are executed by which subjects in respective process phases;
automatically generating messages using the predetermined rules based upon analysis of the at least one matrix (S-PM) during the analysing step;
exchanging the automatically generated messages between the subjects; and
generating the source code automatically using information contained in the matrix relating to the subjects and the actions, and using the automatically generated messages exchanged between the subjects;
wherein in the automatic generation of the source code, functions are generated,
wherein each of said functions is assigned to a subject,
wherein there at least three different functions including SEND, RECEIVE and DO,
wherein the SEND and RECEIVE functions are used to exchange the messages between the subjects,
wherein the matrix includes at least three types of action, including:
an E-action (Execute), in which a subject performs an act;
an S-action (Support) in which a subject provides information to another subject executing an E-action; and
an I-action (Information) in which a subject receives information from another subject executing an E-action;
wherein all of the following messages are generated and exchanged:
an E-message between a subject executing an E-action in a predetermined process phase and a subject executing an E-action in a subsequent phase;
an S-message between a subject executing an S-action and a subject executing an E-action in the same process phase; and
an I-message between a subject executing an E-action and a subject executing an I-action in the same process phase,
wherein within each process phase the messages are sorted in order: S-messages; E-message; and I-message, and
wherein in the automatic generation of the source code, E-actions are represented in the source code by the function DO, and within a process phase the RECEIVE functions for RECEIVING one or more S-messages are located in the source code before the DO function, and the SEND functions for SENDING one or more I-messages are located after the DO function.

9. The system according to claim 8, wherein the computer system is a network with several computers.

10. A non-transitory computer readable medium on which is stored a computer program for generating a source code for executing or simulating a process that involves subjects, process phases and actions which, on loading into a computer, executes a method by which the following steps are executed:
providing predetermined rules for automatically generating and exchanging messages between the subjects;
analysing a process description in which the process is presented in a form of at least one matrix (S-PM), wherein, in the matrix, the subjects and the process phases are linked to the actions in such a way that it is determined by the matrix which actions are executed by which subjects in respective process phases;
automatically generating messages using the predetermined rules based upon analysis of the at least one matrix (S-PM) during the analysing step;
exchanging the automatically generated messages between the subjects; and
generating the source code automatically using information contained in the matrix relating to the subjects and the actions, and using the automatically generated messages exchanged between the subjects;
wherein in the automatic generation of the source code, functions are generated,
wherein each of said functions is assigned to a subject,
wherein there at least three different functions including SEND, RECEIVE and DO,
wherein the SEND and RECEIVE functions are used to exchange the messages between the subjects,
wherein the matrix includes at least three types of action, including:
an E-action (Execute), in which a subject performs an act;
an S-action (Support) in which a subject provides information to another subject executing an E-action; and
an I-action (Information) in which a subject receives information from another subject executing an E-action;
wherein all of the following messages are generated and exchanged:
an E-message between a subject executing an E-action in a predetermined process phase and a subject executing an E-action in a subsequent phase;

an S-message between a subject executing an S-action and a subject executing an E-action in the same process phase; and an I-message between a subject executing an E-action and a subject executing an I-action in the same process phase, wherein within each process phase the messages are sorted in order: S-messages; E-message; and I-message, and wherein in the automatic generation of the source code, E-actions are represented in the source code by the function DO, and within a process phase the RECEIVE functions for RECEIVING one or more S-messages are located in the source code before the DO function, and the SEND functions for SENDING one or more I-messages are located after the DO function.

* * * * *